(12) United States Patent
DeCosta

(10) Patent No.: US 8,350,153 B1
(45) Date of Patent: Jan. 8, 2013

(54) LOCKING MECHANISM FOR JOINING SECTIONS

(76) Inventor: Thomas J. DeCosta, Westport, MA (US)

( * ) Notice: Subject to any disclaimer, the term of this patent is extended or adjusted under 35 U.S.C. 154(b) by 650 days.

(21) Appl. No.: 12/218,644

(22) Filed: Jul. 17, 2008

(51) Int. Cl.
*H02G 3/14* (2006.01)
(52) U.S. Cl. ............ 174/66; 174/67; 174/135; 439/172; 200/241
(58) Field of Classification Search ............ 174/66, 174/67, 50, 58, 135; 220/241, 242, 3.8, 3.92, 220/3.94, 4.02; 248/906; 439/172, 173
See application file for complete search history.

(56) References Cited

U.S. PATENT DOCUMENTS

| | | | | |
|---|---|---|---|---|
| 3,729,572 A | * | 4/1973 | Helin | 174/66 |
| 3,749,815 A | * | 7/1973 | Boatwright et al. | 174/66 |
| 5,955,702 A | * | 9/1999 | Grossman et al. | 174/66 |
| 5,981,875 A | * | 11/1999 | Kesler et al. | 174/66 |
| 5,998,735 A | * | 12/1999 | Patterson, Jr. | 174/67 |
| 7,112,744 B1 | | 9/2006 | DeCosta | |
| D548,572 S | | 8/2007 | DeCosta | |

OTHER PUBLICATIONS

U.S. Appl. No. 29/294,960, DeCosta.
U.S. Appl. No. 12/070,082, DeCosta.
U.S. Appl. No. 61/007,939, DeCosta.

* cited by examiner

*Primary Examiner* — Dhirubhai R Patel

(57) ABSTRACT

The present invention relates to a locking mechanism for joining sections to enable plates to be separated, then reconnected and securely interlocked. A variety of plate configurations may be utilized with the locking mechanism in applications such as cable pass-through, electrical wiring, or any application in which the engagement of structures is desired. The locking mechanism embodying the principles of the present invention includes outwardly extending finger detents adjacent to the cantilever tabs of each plate that slideably engage the bottom surface of an opposing plate section and create resistive forces between the interlocked cantilever tabs. The addition of the finger detents increases the inter-mating strength of the locked plate by providing a resistive moment arm to resist outward forces acting to separate the plate sections. The cantilever tabs further include a locking lip that engages a locking means of an opposing plate section to resist lateral forces acting to separate the plate.

18 Claims, 6 Drawing Sheets

LOCKING MECHANISM FOR JOINING SECTIONS

BACKGROUND OF THE INVENTION

1. Field of the Invention

The present invention relates to a locking mechanism for joining sections to enable plates to be separated, then reconnected and securely interlocked. A variety of plate configurations may be utilized with the locking mechanism in applications such as cable pass-through, electrical wiring, or any application in which the engagement of structures is desired.

2. Description of Related Art

Locking mechanisms for joining plate sections are known in the art, and include plates joined by cantilever tab elements that extend from the ends of each plate section to join the plates. The Following examples of designs by this inventor include applications of plate locking mechanisms for cable pass-through and electrical wiring.

U.S. Pat. No. 7,112,744 entitled Sectional Plate For Wall Port, is an example of the utilization of a cantilever tab mechanism for joining plates. The cantilever tab mechanism of U.S. Pat. No. 7,112,744 is incorporated into various sectional plate designs issued to this inventor including Design Application No. 29/294,960 (Sectional Plate With Grommet and Recessed Receptacle), Utility application Ser. No. 12/070,082 (Sectional Plate for Wall Port Incorporating recessed Scoop for Wire Management), Provisional Application No. 61/007,939 (Sectional Plate for Wall Port Incorporating Dual Use Opening For an Angularly Positionable Connector or a Plurality of Non-Angularly Positionable Connectors), and Design Pat. No. D548,572 (Two-Piece Single Gang Cable Pass Through Plate).

There exists a need for a locking mechanism that provides increased stiffness and inter-mating strength to a locked plate or structure.

SUMMARY OF THE INVENTION

The foregoing and other problems are overcome, and other advantages are realized, in accordance with the disclosed, alternative embodiments of these teachings.

The present invention relates to a locking mechanism for joining sections to enable plates or structures to be separated, then reconnected and securely interlocked. A variety of plate configurations may be utilized with the locking mechanism in applications such as cable pass-through, electrical wiring, piping, tubing and cable management.

In one embodiment in accordance with the teachings of the present invention, utilizing the Sectional Plate Locking Mechanism such as a wall plate for electrical wiring, the sectional wall plates include indentations at their ends to form an opening when the plates are mated together. The form of the opening may include any geometry necessary for the passage of oversized connectors or fittings to be passed therethrough prior to the plate being reconnected and mounted. In another embodiment taught by the present invention the locking mechanism may be utilized with sectional plates including an inward extended opening for the passage of cables and the like.

An embodiment employing the principles of the present invention comprises a first plate section and second plate section that are mateable for easy separation and attachment. Both first and second plate sections include cantilever tab elements that extend from the ends of each plate section to join the plates. The catilever tab elements of subject invention are disclosed in U.S. Pat. No. 7,112,744 entitled Sectional Plate For Wall Port, issued to this inventor on Sep. 26, 2006.

A locking mechanism employing the principles of the present invention includes outwardly extending finger detents adjacent to the cantilever tabs of each plate that slideably engage the bottom surface of an opposing plate section and create resistive forces between the interlocked cantilever tabs. The addition of the finger detents increases the inter-mating strength of the locked plate by providing a resistive moment arm to resist outward forces acting to separate the plate sections. The cantilever tabs further include a locking lip that engages a locking means of an opposing plate section to resist lateral forces acting to separate the plate.

BRIEF DESCRIPTION OF THE DRAWINGS

The foregoing aspects and other features of the present invention are explained in the following description, taken in connection with the accompanying drawings, wherein:

FIG. 1 is a preferred embodiment of the present invention illustrating the principles of subject invention depicting a front perspective view of separated plate halves incorporating the locking mechanism of the present invention, each plate half being the mirror image of the other.

DETAILED DESCRIPTION OF THE PREFERRED EMBODIMENTS

Figure 2:
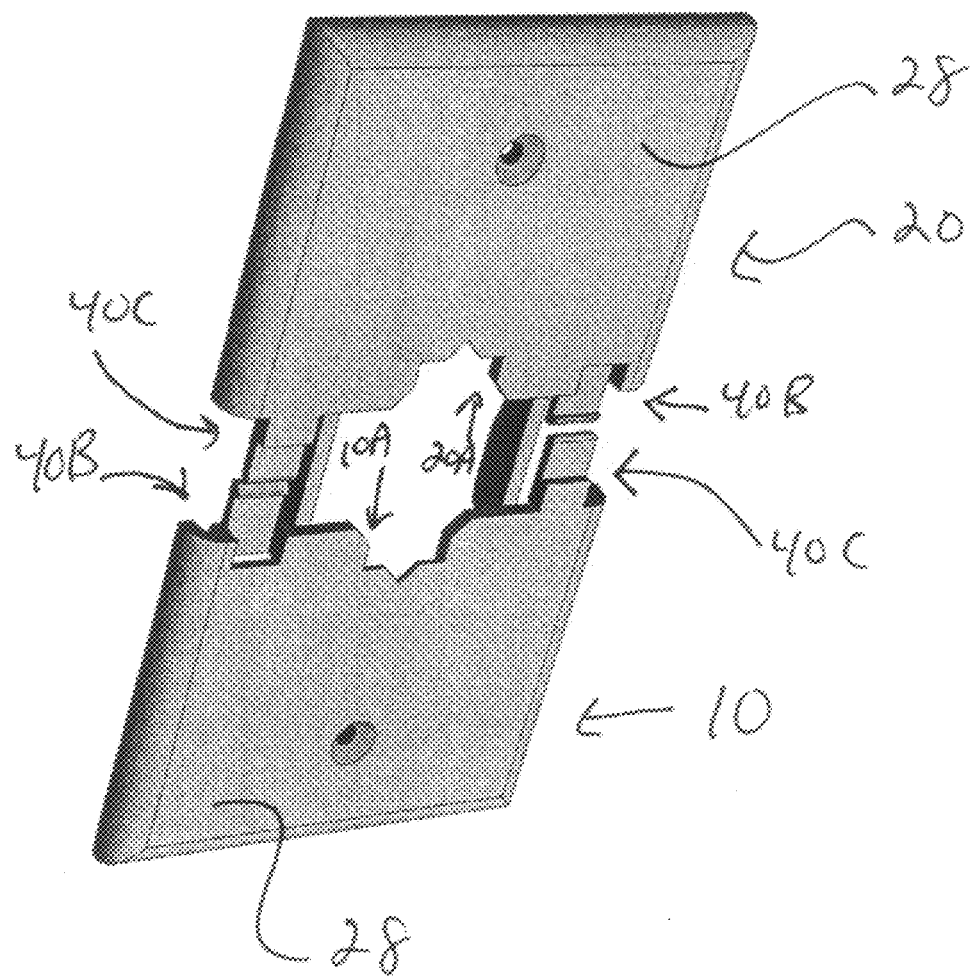
FIG. 2 is a rear perspective view of the drawing of FIG. 1.
Figure 2:
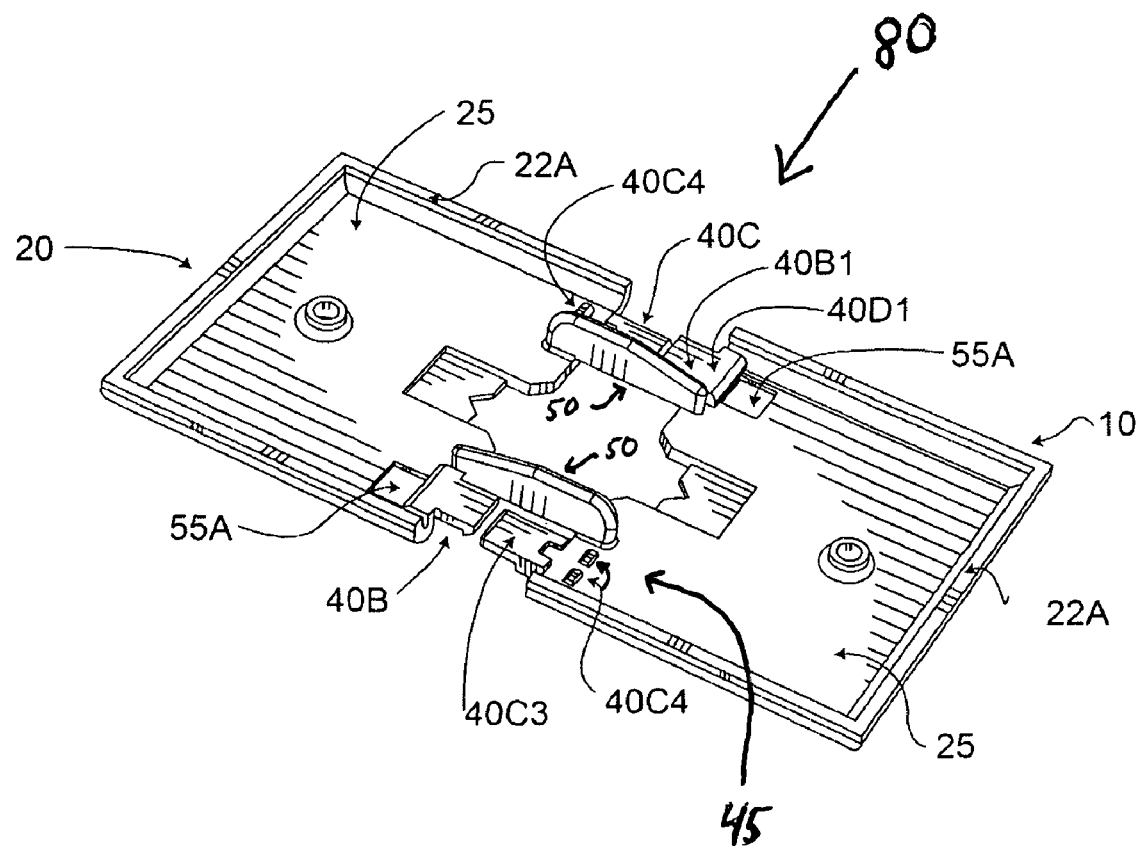

When reading this section which describes exemplary embodiments, one should keep in mind several points. First, the following exemplary embodiments are what the inventor believes to be the best mode for practicing the invention at the time this patent was filed. Thus, since one of ordinary skill in the art may recognize from the following exemplary embodiments that substantially equivalent structures or substantially equivalent acts may be used to achieve the same results in exactly the same way, or to achieve the same results in a not dissimilar way, the following exemplary embodiments should not be interpreted as limiting the scope of just the embodiments described.

Second, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (e.g., one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense.

While certain embodiments of the present invention have been illustrated and described herein, the present invention should not be limited to such illustrations and descriptions. It should be apparent to those skilled in the art that changes and modifications may be incorporated and embodied as part of the present invention and are within the scope of the claims.

Particularly, the drawings of subject invention illustrate a particular type of plate including an interior angular cutout 50B. It is understood that the locking mechanism 80 of the present invention can be utilized to join any type of sections, plates or structures.

Referring to the drawings (FIGS. 1-6) of the invention in detail, FIG. 1 illustrates an embodiment employing the principles of the present invention separated into a first plate section 10 and second plate section 20. These first and second plate sections are constructed for easy separation and engagement with each other. Plate sections 10 and 20, in this preferred embodiment, are identical in construction but are referred to separately to describe the separation and engagement of the plates. It is understood that any description of plate 10 applies to plate 20 and vice versa.

Both first and second plate sections include cantilever tab-like elements 40B and 40C that extend from the ends of each plate section to join the plates. Referring to FIG. 2, Plate sections 10 and 20 include a bottom surface 25 that may include a sidewall extension 22. Extension 22 projects outward from bottom surface 25 extending around the periphery of the plate sections 10 and 20 forming a lip thereround.

Referring to the drawings (FIGS. 1-6) of the invention in detail, FIG. 1 illustrates an embodiment employing the principles of the present invention separated into a first plate section 10 and second plate section 20. These first and second plate sections are constructed for easy separation and engagement with each other, and oppose each other. Plate sections 10 and 20, in this preferred embodiment, are identical in construction but are referred to separately to describe the separation and engagement of the plates. It is understood that any description of plate 10 applies to plate 20 and vice versa.

Figure 6:
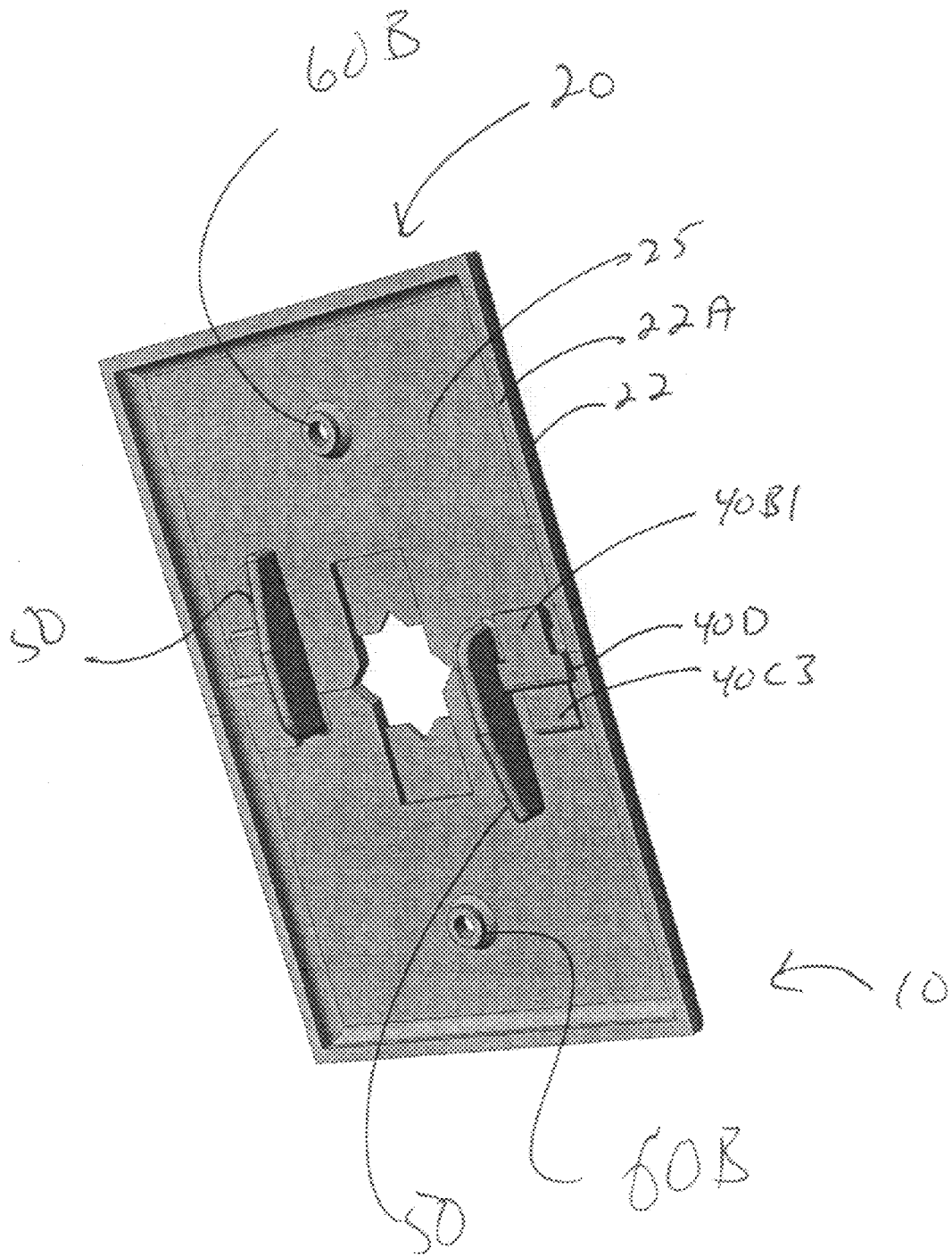
FIG. 6 illustrates the drawing of FIG. 2 with the separated plate halves mated together.

Tab element 40B includes an extended lip portion 40B3 (FIG. 4) that slideably engages protuberance 40C4 (FIG. 2, 3) of an opposing plate section when the plates are mated together (see FIGS. 2, 6). Tab 40B is stiffly resilient to allow portion 40B3 to flex over and rest behind protuberance 40C4 when plate sections 10 and 20 are fully engaged.

Lip portion 40B3 is angled with respect to protuberance 40C4 to provide sufficient contact to resist lateral forces acting to separate plate sections 10 and 20. Locking means 45 other than protuberance 40C4 may include a recess or multiple recesses in the bottom surface 25 to engage lip portion 40B3. Alternatively, tab top surface 40B2 could include a recess or multiple recesses which would engage one or more protuberance 40C4. Furthermore, base portion 40C2 could also include either a recess and/or protuberance that could engage and lock an opposing recess and/or protuberance located within recess 55A or bottom surface 25 of an opposing plate in a similar manner as described above.

Figure 4:
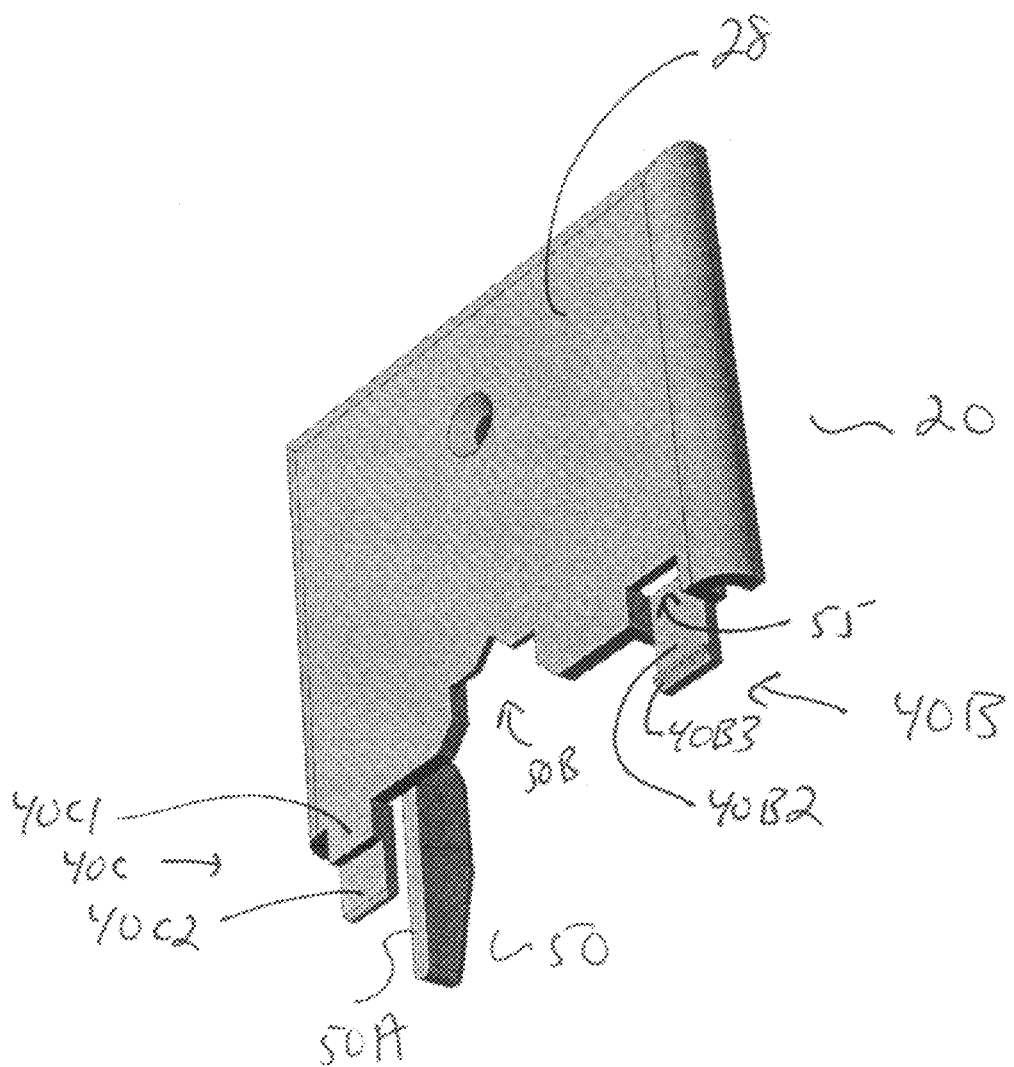
FIG. 4 is a front perspective view of a plate half of FIG. 1.

Referring to FIGS. 2,4 and 6 each plate section 10 and 20 further includes at least one outwardly extending finger detent 50 ridgedly connected at one end to plate sections 10 and 20 bottom surfaces 25 between tab 40B and 40C. The other end of detent 50 extends longitudinally outward from end sections 10A and 20A and includes a substantially planer support surface 50A that is substantially coextensive with bottom surface 25. Support surface 50A slideably engages an opposing plate bottom surface 25 (FIG. 2) up to a point when the plates 10 and 20 are fully engaged (FIG. 6).

The longitudinally extending, substantially planar support surfaces 50A in combination with cantilever tab-like elements 40B and 40C interlocking means provides a structurally ridged mated plate having a resistive moment arm to resist outward and lateral forces acting to separate the plate sections. The detents 50 are stiffly resilient and provide equal and opposite forces to tabs 40B and 40C, and respective plate sections 10 and 20. The equal and opposite forces ensure the plate bottom surfaces remain engaged coplanar to each other.

Referring to FIGS. 3-6, Tab 40B projects outward from end section 20A at a fixed end 40D that is affixed to bottom surface 25. In the preferred embodiment tab 40B is positioned adjacent to sidewall extension 22 to maximize space in the center of the plate. An area of fixed end 40D is secured to and rests planar against an area of bottom surface 25. The area of fixed end 40D that is secured to bottom surface 25 is determined according to desired resistance requirements to bending or pulling forces.

Figure 3:
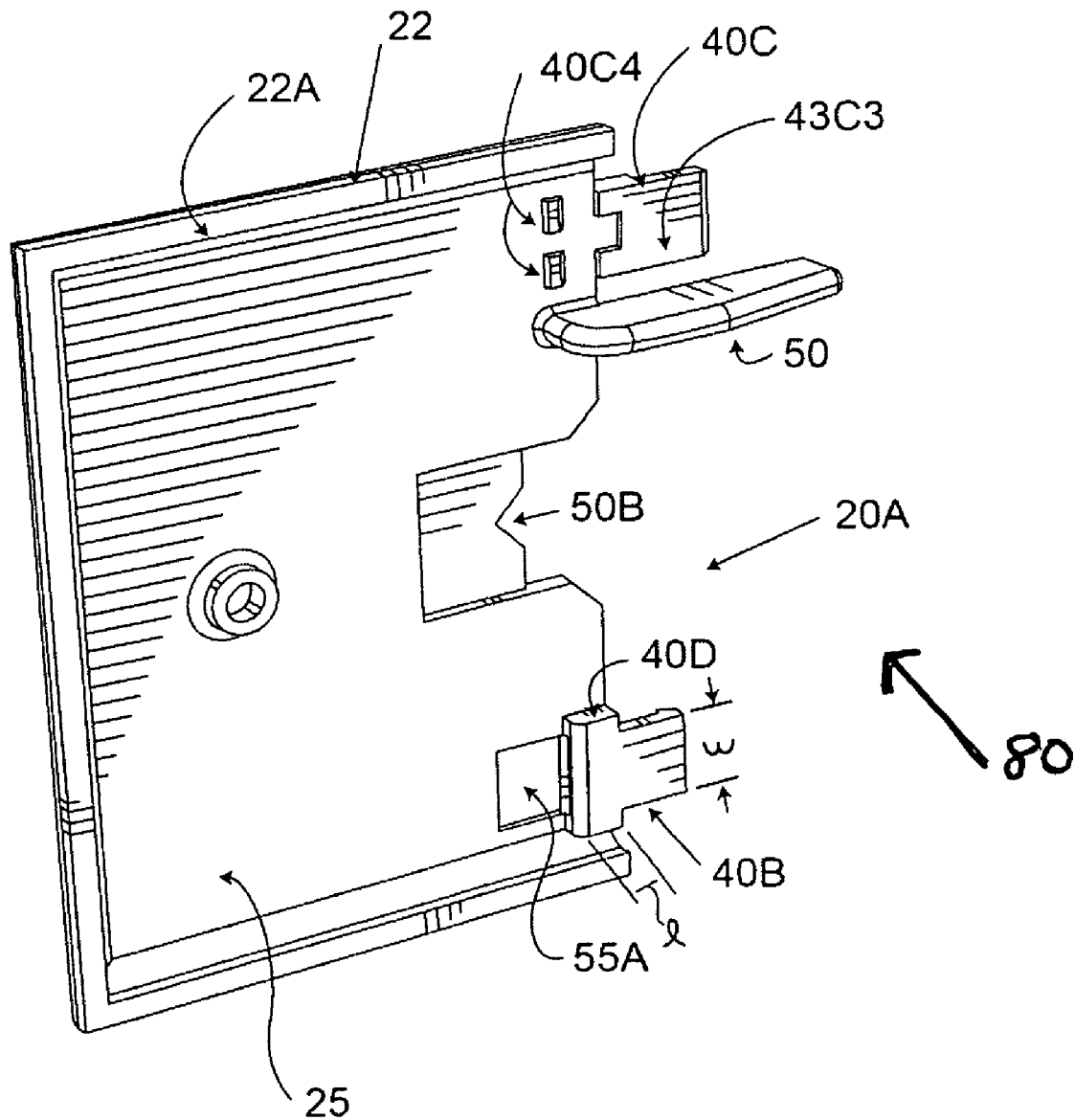
FIG. 3 is a rear perspective view of a plate half of FIG. 2.

The thickness of fixed end 40D and tab 40B is determined to allow for structural integrity, but in the preferred embodiment should not extend beyond sidewall extension bottom surface 22A. In the disclosed preferred embodiment, referring to FIG. 2, sidewall extension bottom surface 22A is raised above fixed end bottom surface 40D1 and tab bottom surface 40B1. Referring to FIGS. 3 and 4, top surface 28 of plate sections 10 and 20 includes a cutout 55 extending the length/of fixed end 40D and the width w of tab 40B.

Referring to FIG. 3, 4 tab 40C comprises a stepped shaped member with an outwardly extending end portion 40C2 and generally perpendicular base portion 40C1.

Tab 40C extends outward from end section 20A at a position adjacent to sidewall extension 22 to maximize space in the center of the plate. Tab 40C is integral to bottom surface 25 such that sidewall extension bottom surface 22A extends beyond tab bottom surface 40C3. Referring to FIGS. 1-6, and for illustrative purposes an angular cutout 50B provides an opening when the plates are mated together.

It is understood that any dimensioned cutout 50B, or no cutout, or any structure located at the center of the plate may be utilized with the locking mechanism of subject invention. It is further understood that the position of tabs 40B and 40C, and the detent 50 may be changed to accommodate various geometric openings for a particular application. Cutout 55 provides an opening above tab top surface 40B2 for insertion of base portion 40C2 (FIG. 1, 4).

Referring to FIGS. 3-6, a recess 55A extends from the periphery of fixed end 40D into bottom surface 25. The recess 55A is of sufficient dimension to allow for base portion 40C2 to slideably engage recess 55A of bottom surface 25 when plates 10 and 20 are mated together.

Figure 5:
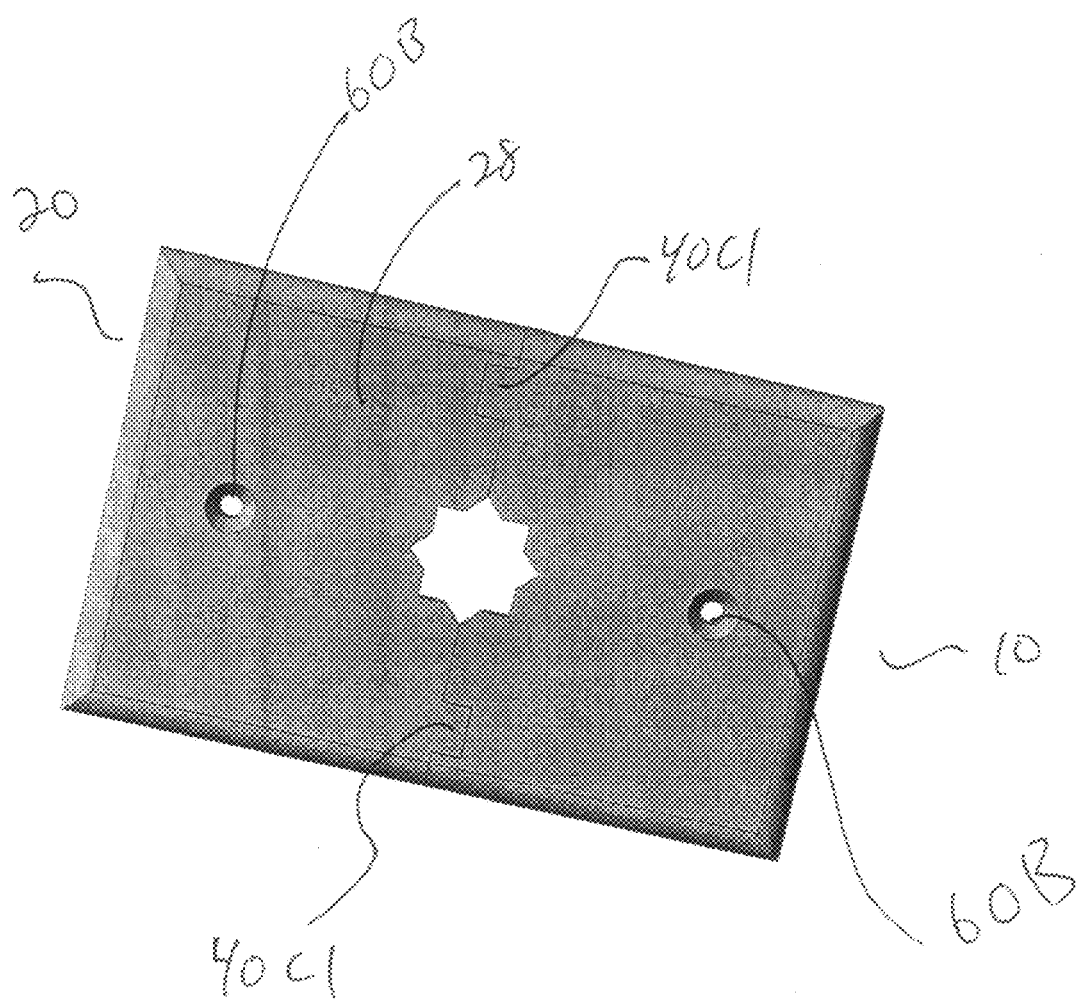
FIG. 5 illustrates the drawing of FIG. 1 with the separated plate halves mated together.

Referring to FIGS. 3,5, and 6 first plate section 10 and second plate section 20 are brought together such that tabs 40B and 40C of each plate section engage the complete plate. End portion 40C2 slideably engages recess 55A of bottom surface 25 up to a point where base portion 40C1 is secured into cutout 55. Tab 40B inserts below tab 40C with tab 40B top surface 40B2 slideably engaging tab 40C bottom surface 40C3.

Tab 40B is stiffly resilient to allow portion 40B3 to flex over and rest behind protuberance 40C4 when plate sections 10 and 20 are fully engaged. Lip portion 40B3 is angled with respect to protuberance 40C4 to provide sufficient contact to resist lateral forces acting to separate plate sections 10 and 20. Support surface 50A of detent 50 slideably engages an opposing plate bottom surface 25 (FIG. 2) up to a point when the plates 10 and 20 are fully engaged (FIG. 6).

Referring to FIG. 5, a top view of a connected plate illustrates base portions 40C1 secured into cutouts 55. Referring to FIG. 6, a bottom view of a connected plate illustrates tab 40B bottom surfaces 40B1 and fixed end 40D placement along bottom surface 25. FIG. 4 further illustrates bottom surface 40C3 of end portion 40C2, which is secured within recess 55A, and detents 50 engaging opposing plates 10 and 20. A Pass through apertures 60B allow screws to secure the sectional plate to an electrical box when the locking mechanism is embodied in an electrical application.

Although the description above contains many specificities, these should not be construed as limiting the scope of the embodiment but as merely providing illustrations of some of the presently preferred embodiments. For example, the size of the plate section openings 50B, finger detents 50, Tabs 40B and 40C, Tab lip portion 40B3, protuberance 40C4, and plate sections 10 and 20 may be may be altered as to position and dimension and still be within the scope of the present invention.

I claim:

1. A locking mechanism to join first and second plate sections, said first and second plate sections having a top surface and a bottom surface, each plate section having a first and second end section, said locking mechanism disposed on said first and second end sections, said locking mechanism comprising:
  first and second engagement tabs extending outward from said first and second end sections of said first and second plate sections, said first engagement tab including an extended lip portion, said second engagement tab including at least one locking means;
  at least one finger detent extending outward from at least one of said first and second end sections, said at least one finger detent ridgedly connected at one end to said at least one first and second end sections, said at least one finger detent including a top surface and a bottom surface,
  said first and second engagement tabs of said first and second plate sections and said at least one finger detent of said at least one of said first and second end sections, being relatively configured and arranged such that, upon relative linear movement of said first and second end sections of said first section with said first and second end sections of said second section into engagement with one another,
  said extended lip portion of said first engagement tab of said first plate section, engages and locks said locking means of said second engagement tab of said second plate section, and said locking means of said second engagement tab of said first plate section engages and locks said extended lip portion of said first engagement tab of said second plate section, said top surface of said at least one finger detent slideably engages said bottom surface of one of said first and second plate sections.

2. A locking mechanism according to claim 1, wherein said second engagement tab extending outward from said first and second end sections is a stepped shaped member.

3. A locking mechanism according to claim 2, wherein said stepped shaped member includes a base portion and an end portion, said base portion including a top surface, said base portion top surface substantially planar to said bottom surface of said first and second plate sections, said end portion stepped down from said base portion top surface and extending outward therefrom, said end portion further including a top surface and a bottom surface, said end portion bottom surface substantially planar to said bottom surface of said first and second plate sections.

4. A locking mechanism according to claim 3, wherein at least one protuberance extends outward from said bottom surface of said end portion.

5. A locking mechanism according to claim 3, wherein said stepped shaped member end portion bottom surface is raised above said bottom surface of said first and second plate sections.

6. A locking mechanism according to claim 3, wherein said first engagement tab includes a first tab base and a first tab end, said first tab base and said first tab end including a top surface and a bottom surface, a first portion of said first tab base top surface affixed to said bottom surface of said first and second plate sections, said first tab end projecting outward from said first tab base.

7. A locking mechanism according to claim 6, wherein said extended lip portion extends outward from said top surface of said first tab end.

8. A locking mechanism according to claim 7, said extended lip portion of said first tab end engaging said at least one locking means of said second engagement tab when said first and said second plate sections are engaged.

9. A locking mechanism according to claim 6, wherein said first engagement tab further includes an opening for receipt of said second engagement tab therein, said opening including a cutout in said first and second end section, said cutout having a periphery, said cutout exposing a second portion of said top surface of said first tab base, said opening further including a recess in said first and second plate sections bottom surface, said recess extending from the periphery of said cutout, said recess dimensioned to accept said end portion stepped down from said base portion.

10. A locking mechanism according to claim 9, wherein said cutout is dimensioned to accept said base portion of said stepped shaped member securely therein, wherein said recess is dimensioned to accept said stepped down end portion of said stepped shaped member securely therein, said first engagement tab end top surface slideably engaging said stepped shaped member end portion bottom surface, said first and second engagement tabs being interconnected.

11. A locking mechanism according to claim 10, wherein said stepped shaped member end portion bottom surface is raised above said bottom surface of said first and second section, said raised end portion bottom surface allowing for proper alignment of said interconnected plates.

12. A locking mechanism according to claim 1, wherein said at least one locking means is a protuberance extending outward from said bottom surface of said first and second plate sections.

13. A locking mechanism according to claim 1, wherein said at least one locking means is a recess disposed on said bottom surface of said first and second plate sections.

14. A locking mechanism according to claim 1, wherein said extended lip portion extends outward at an angle sufficient to engage said locking means.

15. A locking mechanism according to claim 1, wherein said first and second plate sections include an opening, said opening located between said first and said second engagement tabs.

16. A locking mechanism according to claim 1, wherein said first engagement tab extended lip portion is stiffly resilient.

17. A locking mechanism according to claim 1, wherein said first and said second end sections each includes at least one of said finger detents, said finger detents being stiffly resilient and relatively configured to provide equal and opposite forces between said first and second engagement tabs of said first and second plate sections, said first and second plate sections remaining coplanar to each other when subjected to force.

18. A locking mechanism to join first and second plate sections, each plate section having a top surface and a bottom surface, said locking mechanism comprising:
  at least one engagement tab adapted to secure said first and second plate sections; and
  at least one finger detent ridgedly connected and extending outward from at least one of said first and second plate sections, said finger detent comprising a bottom surface that slideably engages said bottom surface of an opposing said at least one of said first and second plate sections.

* * * * *